(12) United States Patent
Takemura et al.

(10) Patent No.: US 7,634,366 B2
(45) Date of Patent: Dec. 15, 2009

(54) FLUID FLOW MEASURING INSTRUMENT

(75) Inventors: Koichi Takemura, Nara (JP); Daisuke Bessyo, Nara (JP); Fumikazu Shiba, Nara (JP); Yuji Nakabayashi, Nara (JP)

(73) Assignee: Panasonic Corporation, Osaka (JP)

( * ) Notice: Subject to any disclaimer, the term of this patent is extended or adjusted under 35 U.S.C. 154(b) by 135 days.

(21) Appl. No.: 12/028,539

(22) Filed: Feb. 8, 2008

(65) Prior Publication Data
US 2008/0289434 A1 Nov. 27, 2008

Related U.S. Application Data

(63) Continuation of application No. PCT/JP2006/315707, filed on Aug. 9, 2006.

(30) Foreign Application Priority Data
Aug. 16, 2005 (JP) .............................. 2005-235734

(51) Int. Cl.
*G01F 1/66* (2006.01)
(52) U.S. Cl. ........................................................ 702/45
(58) Field of Classification Search ................. 702/45, 702/50, 100; 700/281, 282; 73/861, 861.03
See application file for complete search history.

(56) References Cited

U.S. PATENT DOCUMENTS

| 4,337,667 | A * | 7/1982 | Takada | 73/861.28 |
| 6,796,189 | B1 * | 9/2004 | Umekage et al. | 73/861.27 |
| 6,941,821 | B2 * | 9/2005 | Umekage et al. | 73/861.27 |
| 2005/0000301 | A1 * | 1/2005 | Umekage et al. | 73/861.27 |
| 2008/0148866 | A1 * | 6/2008 | Frohlich et al. | 73/861.28 |

FOREIGN PATENT DOCUMENTS

| JP | 09-133562 | * | 5/1997 |
| JP | 9-133562 | A | 5/1997 |
| JP | 09-304139 | * | 11/1997 |
| JP | 9-304139 | A | 11/1997 |
| JP | 2001-289681 | A | 10/2001 |
| JP | 2002-310752 | * | 10/2002 |
| JP | 2002-350202 | A | 12/2002 |
| JP | 2003-028685 | A | 1/2003 |
| JP | 2003-315124 | A | 11/2003 |

OTHER PUBLICATIONS

International Search Report issued Sep. 12, 2006.

* cited by examiner

*Primary Examiner*—Michael P. Nghiem
*Assistant Examiner*—Cindy H Khuu
(74) *Attorney, Agent, or Firm*—Brinks Hofer Gilson & Lione

(57) ABSTRACT

A measurement control section includes a time measuring section for controlling an operation of measuring a travel time of an ultrasonic wave. The measurement control section operations, based on a high rate clock signal supplied from a ceramic oscillation circuit during the time measuring operation. A clock control section stops the high rate clock signal supplied from the ceramic oscillation circuit every time when the time measuring section completes its time measuring operation, and uses a low rate clock signal supplied from a quartz oscillation circuit to count a standby time between the end of measuring the travel time and the start of carrying out the next measuring operation.

19 Claims, 9 Drawing Sheets

FLUID FLOW MEASURING INSTRUMENT

This application is a continuation of PCT Application No. PCT/JP2006/315707 filed Aug. 9, 2006, which claims priority to Japanese Application No. 2005-235734 filed Aug. 16, 2005, the entire contents of which applications are incorporated herein by reference.

TECHNICAL FIELD

The present invention relates to a flow measuring instrument for fluid, which measures a velocity or a volume of flowing fluid based on a travel time of an ultrasonic signal therethrough.

BACKGROUND

A conventional flow measuring instrument employs the sing-around method that improves the measuring resolution by repeating a transmission and reception between a pair of oscillators for multiple times. FIG. 9 shows a conventional flow measuring instrument for fluid, which employs the sing-around method. The instrument is formed with a first oscillator 52 for transmitting an ultrasonic wave, a second oscillator 53 for receiving the ultrasonic wave transmitted, both oscillators 52 and 53 being disposed on a fluid conduit 51, and a measurement control section 54 for measuring a travel time of the ultrasonic wave traveling between the oscillators 52 and 53.

Assume that the velocity of the ultrasonic wave is "C"; a flow velocity is "v"; a distance between the pair of oscillators is "L", and an angle of the traveling direction of the ultrasonic wave with respect to the flow direction is θ. Assume also that a travel time of the ultrasonic wave transmitted from the oscillator placed upstream of the conduit to the other oscillator placed downstream thereof is "ta"; and a travel time in the opposite direction is "tb". Then, the travel times "ta" and "tb" can be expressed by the following equations:

$ta=L/(C+v\times\cos\theta)$, and $tb=L/(C-v\times\cos\theta)$.

The velocity "v" can be derived from the above two equations as follows;

$v=L\times(1/ta-1/tb)/2\cos\theta$.

The velocity "v" thus derived is multiplied by a sectional area "S" of the conduit and a correction coefficient "K", so that an instant flow volume "Q" of the fluid can be expressed as $Q=v\times S\times K$.

When the velocity "v" is small, a difference between "ta" and "tb" is also small, so that it is difficult to measure the difference accurately. It is thus necessary to repeat the measurement for multiple times and average the results to minimize associated errors and improve the measurement resolution.

This measurement operation is implemented as follows: An ultrasonic wave is repeatedly transmitted for "n" times from the upstream side to the downstream side. Assume that the total time necessary for the "n" time-transmission/reception is "Ta". Then, the ultrasonic wave is likewise repeatedly transmitted in the opposite direction for "n" times. The total time necessary for this opposite "n" time-transmission/reception is "Tb". "Ta" and "Tb" thus obtained are divided by "n" respectively to derive respective travel times "ta" and "tb" per one transmission. The travel times "ta" and "tb" thus averaged are used in the equation for deriving an instant flow volume "Q", whereby an accurate flow volume can be calculated.

Such an measurement operation is carried out repeatedly at regular intervals "τ" e.g. every two seconds, and each of the derived instant flow volumes "Q" is multiplied by this time interval "τ", whereby volumes of fluid which passed through the conduit 1 for the time intervals "τ" can be obtained. The results are integrated to thereby obtain a total volume of the fluid flow.

However, the measurement operation discussed above has a problem that under conditions that a fluid flow cyclically changes in such a manner that the flow velocity changes during the time interval "τ", the measurement results necessarily contain errors depending on phases of the cyclically changing fluid flow in which the measurement is carried out.

To overcome this problem, unexamined Japanese Patent Publication No. 2003-28685 discloses a method in which an average of flow velocities is calculated in each of the phases of the cyclically changing fluid flow to thereby obtain an accurate flow volume. FIG. 10 shows a timing chart illustrating this method, which shows timings of measurement along flow changes. Starting at time "$\tau_{a1}$", travel times of ultrasonic wave are measured at four times which propagates between the first oscillator 52 (transmitter) placed upstream and the second oscillator 53 (receiver) placed downstream. Then, the measurement control section 54 switches the role of the first oscillator 52 and the second oscillator 53, and starting at time "$\tau_{b1}$", travel times are similarly measured at four times.

These travel times measured in both directions are referred to as a first set of measurements, and given sets of measurements are then performed. Further in FIG. 10, starting at time "$\tau_{a2}$", measurements are performed with the first oscillator 52 (transmitter) and the second oscillator 53 (receiver), and starting at time "$\tau_{b2}$", measurements are again performed with the first oscillator 52 (receiver) and the second oscillator (transmitter). These measurements are referred to as a second set of measurements.

The travel times in both directions are measured for "m" sets ("m" is an integer). The measurement control section 4 then obtains the total travel times "Ta" for the measurements performed, starting at time "$\tau_{am}$", with the upstream transmitter, and the total travel times "Tb" for measurements performed, staring at time "$\tau_{bm}$", with the downstream transmitter. "Ta" and "Tb" are divided by the number of measurements (4×m) to obtain averages "ta" and "tb" per a measurement, using which an average flow volume of the fluid is thereafter calculated. This series of operations is carried out at regular intervals, whereby the integrated flow volume can be obtained.

By choosing a proper time interval between the respective sets of measurements and a proper number of measurement sets, measurements can be performed in all the phases of the cyclically changing fluid flow, so that an accurate flow volume is obtainable.

However, in the above-explained conventional method, during a series of measurements which consists of a given number of sets of measurements, samplings are carried out at very short intervals, e.g., every several milliseconds, and results of respective samplings are integrated. It is also necessary to keep supplying power to the electronic circuits forming the measurement control section in order to control the intervals between the measurements, control the number of measurement sets, and store the integrated results. The electronic circuits thus consume a lot of electricity, and if used in a gas meter installed outside a house, need a battery of a large capacity.

DISCLOSURE OF THE INVENTION

The present invention is to provide a fluid flow measuring instrument which comprises a first oscillator disposed at a fluid conduit for transmitting an ultrasonic signal and a second oscillator for receiving the ultrasonic signal transmitted from the first oscillator. The instrument comprises a time measuring section for measuring a travel time of the ultrasonic wave between the two oscillators by measuring a travel time or a plurality of travel times of the ultrasonic wave between the two oscillators. The instrument further comprises a calculation section for calculating a flow velocity or a flow volume based on the travel time measured by the time measuring section.

The fluid flow measuring instrument according to the present invention comprises a high rate clock generator working at a high frequency, a low rate clock generator working at a low frequency and a clock control section for controlling the operation of the high rate clock. The fluid flow measuring instrument according to the present invention further comprises a measurement control section, using the high rate clock from the high rate clock generator as well as the low rate clock from the low rate clock generator, controls the measuring operation of the pair of the oscillators and the time measuring section.

The clock control section stops the high rate clock from the high rate clock generator after the time measuring section finishes the time measuring operation. The foregoing structure can reduce the power consumption during the series of measuring steps, so that a power-saving measurement operation is achievable while being able to keep up with cyclic changes in the flow volume.

DETAILED DESCRIPTION OF THE PREFERRED EMBODIMENTS

Exemplary embodiments of the present invention will hereinafter be explained with reference to the accompanying drawings.

Embodiment 1

Figure 1:
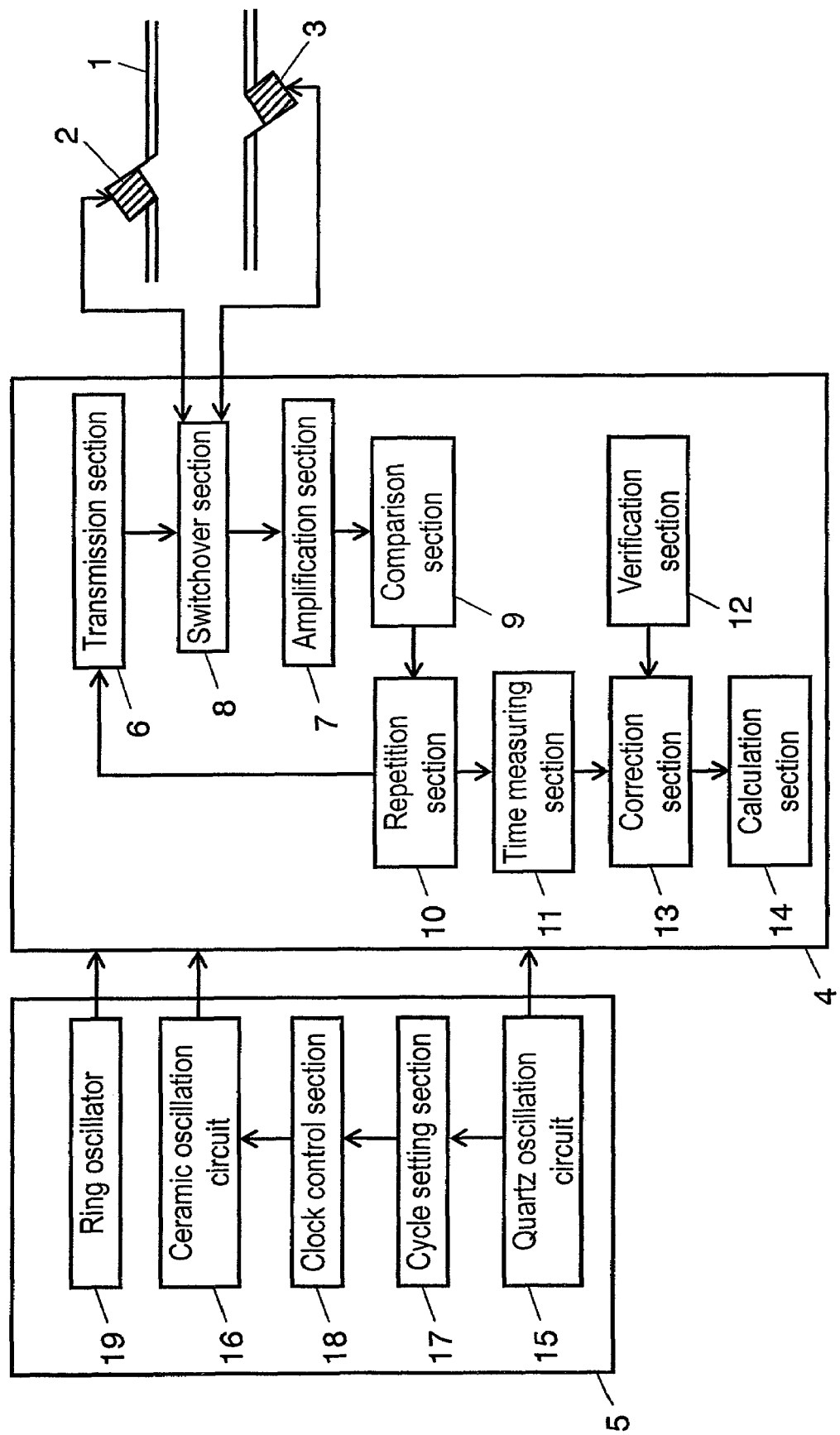
FIG. 1 shows a block diagram of a fluid flow measuring instrument in accordance with a first embodiment of the present invention.

FIG. 1 shows a block diagram of a fluid flow measuring instrument in accordance with the first embodiment of the present invention. A conventional fluid flow measuring instrument, which measures a flow volume and the like, using a travel time of an ultrasonic wave, has a measuring section placed in a fluid flow and measures a flow velocity of the fluid flowing through this measuring section, based on a travel time of ultrasonic wave propagating between ultrasonic-wave oscillators. A flow volume can be calculated by multiplying the measured flow velocity with the sectional area of the flow path of the measuring section and a given correction coefficient.

The most important factor for achieving an accurate measurement of a flow volume and the like depends on the state of the fluid at the measuring section. In other words, turbulence in the fluid flow which may occur at the measuring section disturbs propagation of an ultrasonic wave and prevents an accurate measurement.

To overcome this problem, a sectional shape of the measuring section is made rectangular, and the rectangular cross section is divided along its shorter side by partitioning it with plates so that a plurality of flat flow paths are formed in parallel to the longer side. These flat flow paths are effective in turning the fluid flow into laminar flows, i.e., two-dimensional and stable flows.

In FIG. 1, a first oscillator 2 is placed upstream of the flow in a fluid conduit 1, which transmits an ultrasonic wave, and a second oscillator 3 is placed downstream of the flow, which receives the ultrasonic wave transmitted from the first oscillator 2. Both oscillators are angularly placed with respect to the flow, facing each other.

The foregoing angular placement of the first and second oscillators 2, 3 with respect the flow is called "Z path" pattern, and the first embodiment of the present invention employs the Z path; however, the present invention is not limited to the Z path. For instance, a pair of oscillators may be placed on the same side of a wall at the measuring section, and travel times of an ultrasonic wave are measured which is bounced back once (V path) or twice (W path) at the opposite side of the wall. Another method may be employed in which a pair of oscillators is placed non-angularly with respect to the flow, i.e., the ultrasonic wave is transmitted and received substantially in parallel to the flow (I path).

A measurement control section 4 includes an electronic circuit that functions to control a transmission of the ultrasonic signal between the first oscillator 2 and the second oscillator 3 and is formed of digital and analog circuits. A sync setting section 5 controls the process timings of the measurement control section 4.

The measurement control section 4 comprises the following elements: a transmission section 6 for outputting a transmission signal to the first oscillator 2; and an amplification section 7 for amplifying a reception signal received by the second oscillator 3. The transmission section 6 and the amplification section 8 are connected to the first and second oscillators 2 and 3 via a switchover section 8 for switching the functions of the first oscillator 2 and the second oscillator 3.

The transmission section 6 prompts the first oscillator 2 to output an ultrasonic signal to the second oscillator 3. The signal received is amplified by the amplification section 7 and then compared with a reference signal by a comparison section 9. The wave is determined to arrive when the signal compared agrees with the reference signal.

Under the control of a repetition section 10, the foregoing set of operations, starting from outputting a transmission signal by the transmission section 6 and ending with detecting the reception wave by the comparison section 9, is repeated for a predetermined number of times, and the total time needed for the repeated sets is measured by a time measuring section 11.

A verification section 12 verifies accuracy of the oscillating cycles of a plurality of clocks equipped in the sync setting section 5. A correction section 13 calculates an accurate travel time, based on the travel time obtained by the time measuring section 11 and the clock oscillating cycles verified by the verification section 12. Using the accurate travel time, a calculation section 14 calculates a fluid velocity, and a flow volume if necessary.

The sync setting section 5 comprises the following elements: a low rate clock generator formed of a quartz oscillation circuit 15 for supplying a sync clock of high accuracy to the measurement control section 4; and a high rate clock generator formed of a ceramic oscillation circuit 16. The quartz oscillation circuit 15 operates constantly to provide the reference time for the entire measurement control section 4.

A cycle setting section 17 controls time intervals between the measuring operations repeated by the repetition section 10 by triggering a clock control section 18 at a predetermined time interval to output a signal to trigger the ceramic oscillation circuit 16 to begin its operation.

Further, after the clock signal generated by the ceramic oscillation circuit 16 becomes stable, the clock control section 18 starts supplying the high rate clocks as sync clocks to the measurement control section 4. The measurement control section 4 carries out the foregoing measuring operations, based on the sync clock. An auxiliary clock generator is formed of a ring oscillator 19 and is used for supplying a clock signal whose cycle is shorter than that of the high rate clock.

Figure 2:
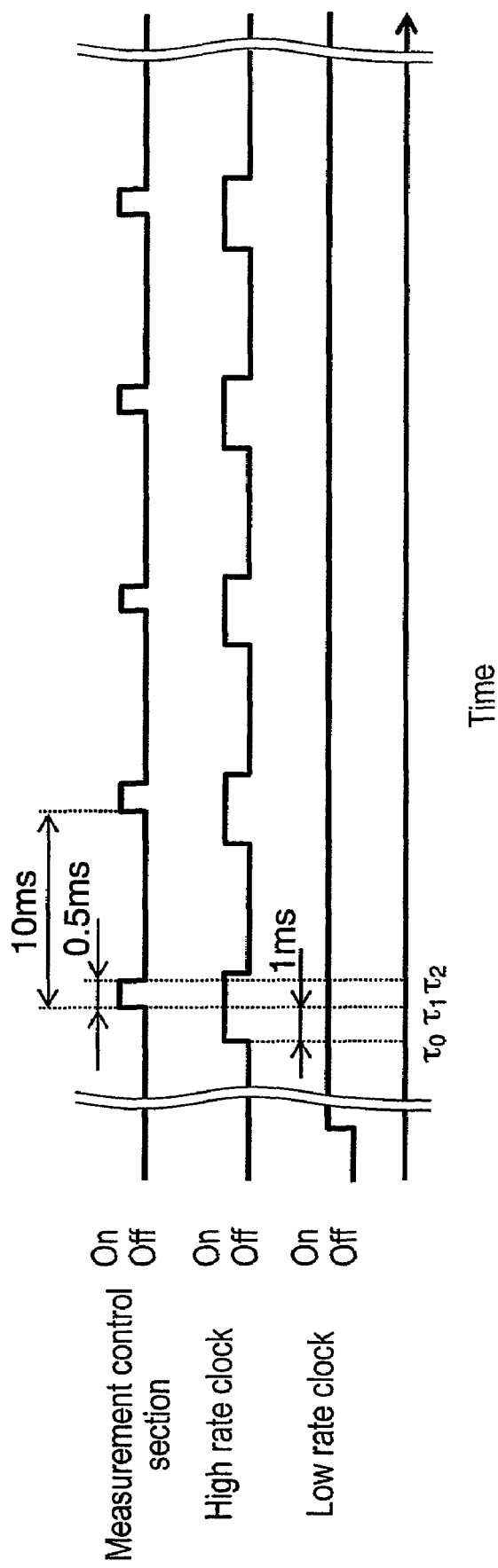
FIG. 2 shows a timing chart illustrating an operation of a measurement control section of the fluid flow measuring instrument in accordance with the first embodiment of the present invention.

FIG. 2 shows an operational relationship between the measurement control section 4 and the sync setting section 5. In order to keep up with changes in pressure, the measurement control section 4 is triggered to measure a flow velocity at short time intervals, e.g., every 10 ms as shown in FIG. 2.

A time needed for the measurement control section 4 to complete a measurement is, e.g., 0.5 ms as shown in FIG. 2, which is a lot shorter than the time interval between the measurements. Given the time measurement performed by the time measuring section 11 and waveform shaping performed on the transmission signal by the transmission section 6, which need to operate on the nanosecond order, such digital circuits of the measurement control 4 are supplied with a relatively high rate clock, e.g., 10 MHz.

On the other hand, during a period of resting time after the measurement operations are completed, no high speed process is performed except counting the accurate time interval to come.

Hence, as shown in FIG. 2, before the measurement control section 4 starts its measuring operations, the clock control section 18 prompts the ceramic oscillation circuit 16 to begin operating at time $\tau_0$, and after the ceramic oscillation circuit 16 becomes stable, e.g., in 1 (one) ms, the measurement control section 4 starts operating at time $\tau_1$ in synchronism with the sync clock signal supplied from the ceramic oscillation circuit 16.

After the series of operations is finished, the clock control section 18 stops the ceramic oscillation circuit at time $\tau_2$ to thereby stop the supply of the high rate clocks. The quartz oscillation circuit 15 supplies clocks (e.g., 32.768 KHz used in the oscillation circuit of electronic clocks), which are a lot slower than the clocks of the ceramic oscillation circuit 16, and constantly supplies the clocks for the operations of the entire instrument.

To be more specific, the operation for monitoring the duration of the resting time intervals after the measurement control section 4 completes its measurement operations and the operation for monitoring the time duration after the ceramic oscillation circuit 16 is triggered before the measurement control section 4 initiates its measurement operations are performed, based on the low rate sync clocks supplied from the quartz oscillation circuit 15.

Figure 3:
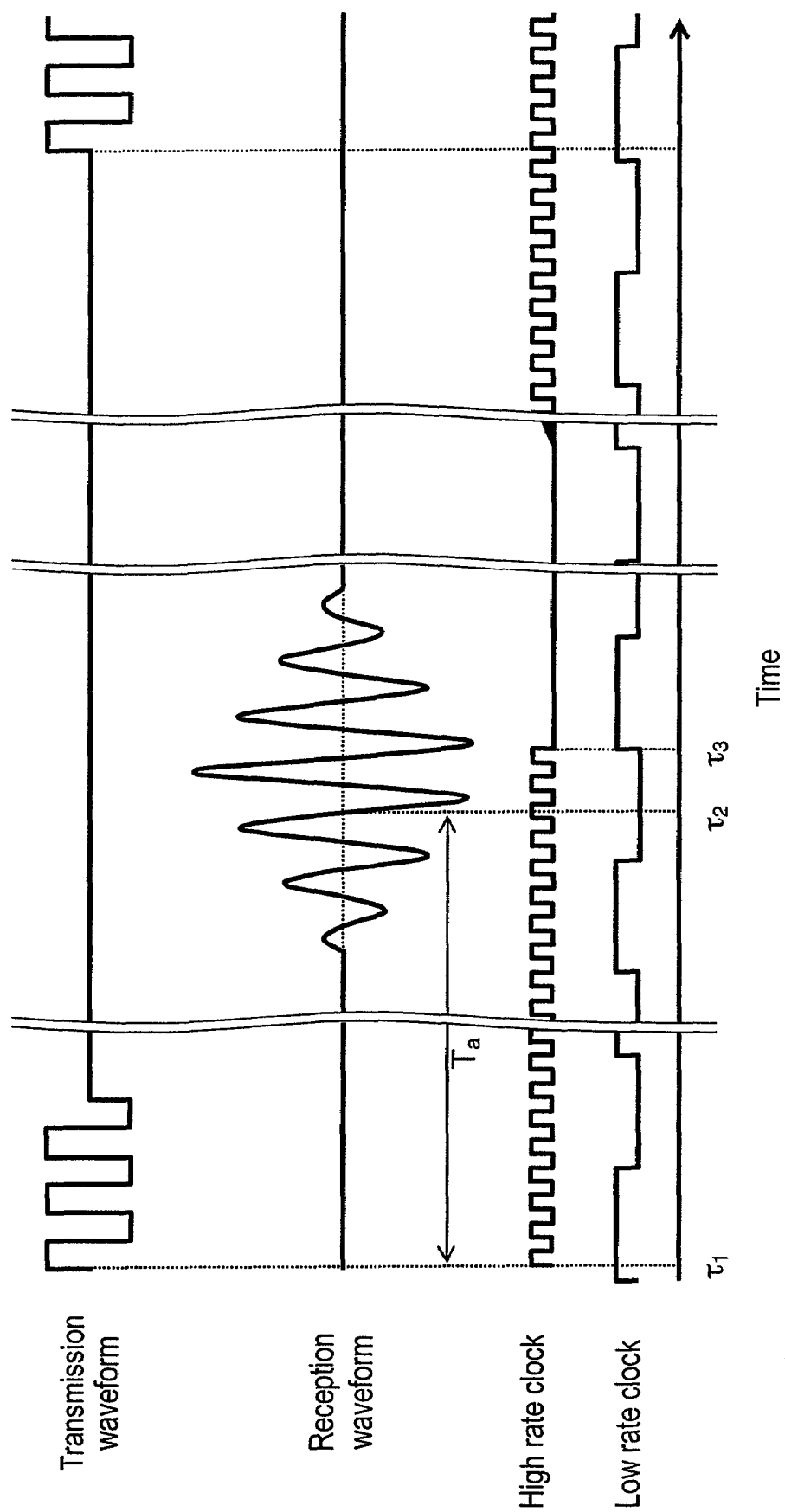
FIG. 3 shows another timing chart illustrating an operation of the measurement control section of the fluid flow measuring instrument in accordance with the first embodiment of the present invention.

FIG. 3 explains the detailed operations of the ceramic oscillation circuit 16. FIG. 3 is a timing chart showing an operational relationship between the measurement control section 4 and the sync clocks. At time $\tau_1$, based on the high rate clocks supplied from the ceramic oscillation circuit 16, the transmission section 6 begins applying a square wave voltage signal to the first oscillator 2.

At the same time, the time measuring section 11 begins counting the leading edges of the high rate clocks to measure a travel time. It is at time $\tau_2$ that the comparison section 9 detects reception of the last wave in the last set of the predetermined number of repeated measurement sets repeated by the repetition section 10. The time measuring section 11 measures a time Ta which is indicative of a time period from time $\tau_1$ to time $\tau_2$.

When the time measurement is completed, post processes such as storing and transmitting the measurement results are conducted. Then, the clock control section 18 stops the operation of the ceramic oscillation circuit 16 at time $\tau_3$. Thereafter, using the low rate clocks supplied from the quartz oscillation circuit 15, a time duration is counted during which the ceramic oscillation circuit 16 has to rest, in order to determine a timing to trigger the transmission section 6 to begin outputting a square wave voltage signal.

As discussed above, the clock control section 18 stops the ceramic oscillation circuit 16 from outputting the high rate clocks when the time measuring section 11 completes the time measuring operation. The power consumed for the time measuring operation can be reduced. Thus, a power-saving measuring operation can be achieved, while keeping up with cyclic changes of flow rate.

Figure 4:
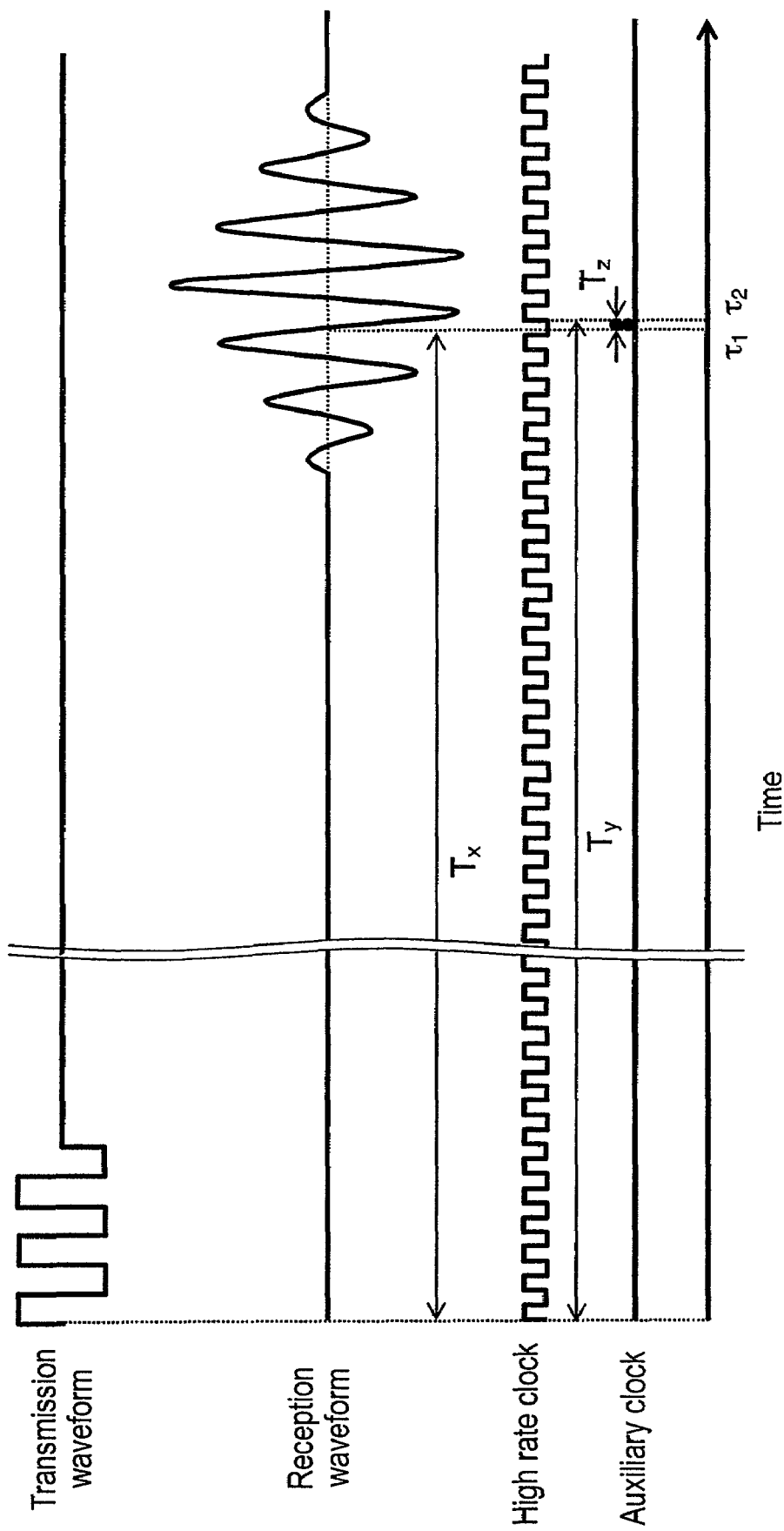
FIG. 4 shows a timing chart illustrating an operation of a time measuring section of the fluid flow measuring instrument in accordance with the first embodiment of the present invention.

Next, a method of measuring a travel time by the time measuring section 11 will be explained with reference to FIG. 4. An arrival time of a reception wave is measured with the high rate clocks of 10 MHz, but its measurement resolution is the order of 100 nanoseconds (ns).

As already described, the conventional measuring instruments need to operate on a time accuracy of several ns or several hundreds ps (picosecond). In order to satisfy such a need, either a higher rate clock has to be used or the number of sing-around operations is increased. But both result in greater power consumption.

The fluid flow measuring instrument in accordance with the first embodiment includes an auxiliary clock generator which supplies clocks of a higher rate than those of the high rate clock. The ring oscillator 19 as an auxiliary clock generator supplies auxiliary clocks during a segment of the time measuring operation by the time measuring section 11. The time measuring section 11 counts a travel time, using both the high rate clocks and the auxiliary clocks. To be more specific, as shown in FIG. 4, the clock faster than the high rate clock is triggered to operate during an extremely short period of time, thereby achieving a higher accuracy. In other words, the auxiliary clock (operating at e.g., 100 MHz) is triggered to function upon a detection of a reception wave at time $\tau_1$ in order to measure a time period, using both the high rate clocks and the auxiliary clocks, until the next high rate clock steps up at time $\tau_2$. Assuming that a time period measured, using the high rate clocks, is "Ty", and a time period measured, using the auxiliary clocks, is "Tz", then an accurate travel time "Tx" can be expressed as Tx=Ty-Tz. "Tz" is a time duration during which the auxiliary clocks are supplied within the time period of the time measuring operation performed by the time measuring section 11. The time measuring section 11 thus can measure a travel time using both the high rate clocks and the auxiliary clocks.

Under this method, since the time resolution achieved by the time measuring section 11 is determined by the auxiliary clocks, the frequency of the high rate clocks can be chosen based on the time accuracy needed for the timings of other operations such as outputting a square wave from the transmission section 6.

The oscillating frequency of the high rate clock thus needs not be unnecessarily increased. The auxiliary clock operates only in a segment of time, and thus causes only a little increase of the overall power consumption. As a result, by defining the appropriate relationship between the high rate clock and the auxiliary clock, a further reduction in the power consumption becomes possible.

The high frequency auxiliary clocks could become the source of noise. However, in the foregoing operation, since the auxiliary clock operates after time $\tau_1$ at which reception of wave is detected, the noise will not interfere with detection of reception of the wave and thus will not compromise the accuracy of the time measurement.

Operations of the verification section 12 and the correction section 13 will hereinafter be explained. Considering the degree of electric current consumption, since it is advantageous that the high rate clock generator outputs clocks having a short rise time, the generator employs a ceramic oscillator. However, the ceramic oscillator is at most as accurate as 0.1-1% and is inferior to the quartz oscillator, which is as accurate as several tens of ppm.

Assuming that there is a 1% time error involved, an error in measuring a flow volume is also 1% as discussed in the conventional instrument. In other words, an error ensues which is equal to the time error of the oscillator, and given the errors resulting from other error factors, the accuracy of measurement is further compromised.

In the case where the measuring instrument is required by its product specification to output results with an error rate of less than 1%, the clocks supplied from the ceramic oscillation circuit 16 will cause the problem that the required accuracy cannot be achieved.

Using the low rate clocks from the quartz oscillation circuit 15 used as the low rate clock generator, which are highly accurate compared to the high rate clocks, the verification section 12 can calculate the accurate oscillating cycle of the high rate clock, based on a ratio between the oscillating cycle of the low rate clocks and that of the high rate clocks. The correction section 13 can thus calculate the accurate travel time, based on the oscillating cycle of the high rate clocks determined by the verification section 12.

Figure 5:
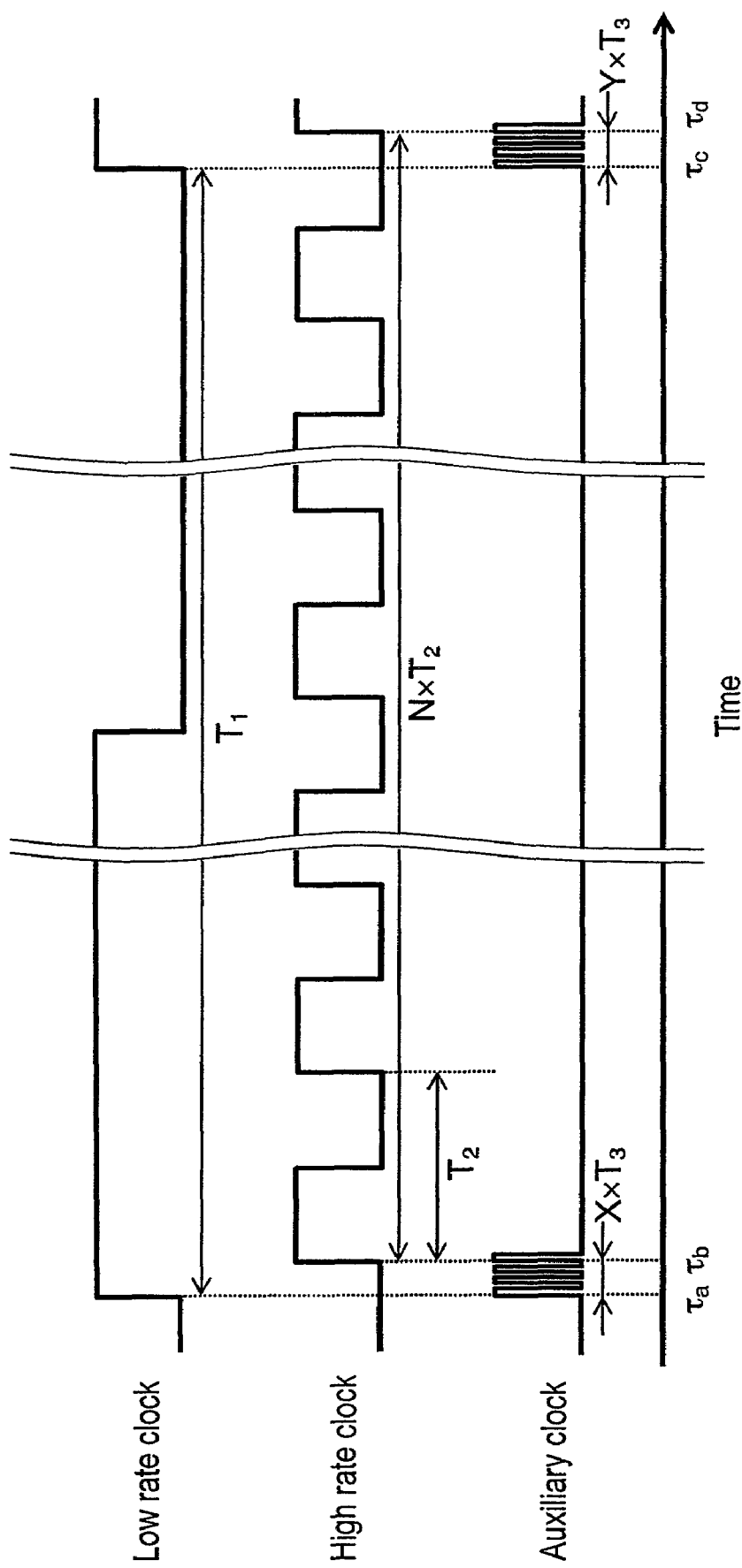
FIG. 5 shows a timing chart illustrating a method of verifying a high rate clock of the fluid flow measuring instrument in accordance with the first embodiment of the present invention.

The operation discussed above will be explained in more detail with reference to FIG. 5. As shown in FIG. 5, assume that the cycles of low rate clocks, the high rate clocks, and the auxiliary clocks are $T_1$, $T_2$ and $T_3$, respectively. The verifying operation starts at rising edge $\tau_a$ of the low rate clock. At the same time, the auxiliary clock used in measuring the travel time is triggered to count a time until the next rise of the high rate clock is inputted (at time $\tau_b$). Assuming that the counted value is X, then the time period from $\tau_a$ to $\tau_b$ is expressed as $X \times T_3$.

The auxiliary clock is triggered again at time $\tau_c$ when the rising edge of the low rate clock is inputted to count a time period until the next rising edge of the high rate clock is inputted (at time $\tau_d$). Assuming that the counted value is Y, then the time period from $\tau_c$ to $\tau_d$ is expressed as $Y \times T_3$.

In the meantime, the time period from $\tau_b$ to $\tau_d$ is counted, using the high rate clocks. Assuming that the counted value is N, then the time period counted from $\tau b$ to $\tau d$ is expressed as $N \times T_2$. As FIG. 3 tells, $T_1 = X \times T_3 + N \times T_2 - Y \times T_3$, so $T_1 = N \times T_2 + (X-Y) \times T_3$ is derived.

Since T1 represents the cycle of the highly accurate low rate clock, $T_1$ can be treated as a known value. If the ratio of $T_2$ and $T_3$ is a known value M (the equation defining the relationship between $T_2$ and $T_3$ will be explained later), the relationship between $T_1$ and $T_2$ is expressed as $T_2 = T_1 / \{N + (X-Y)/M\}$.

Since $T_1$ is a highly accurate value, $T_2$ can also be considered as a highly accurate and reliable value. As discussed above, the auxiliary clock generator supplies auxiliary clocks during time segments, i.e., the time segment from $\tau_a$ to $\tau_b$ and the time segment from $\tau_b$ to $\tau_d$, while the verification section 12 conducts its verification operation. The verification section 12 determines the oscillation cycle of the high rate clocks, based on the oscillation cycles of the low rate clocks and the auxiliary clocks having a higher rate than that of the high rate clock. Therefore, the oscillation cycle of the high rate clock can be determined accurately, thereby improving the measuring accuracy.

In this embodiment, the auxiliary clock is used in the verifying operation by the verification section 12; however, if the frequency ratio of the high rate clocks and the low rate clocks is great enough, e.g., over 1000 times, the verified value can be obtained accurately without using the auxiliary clocks.

Since the auxiliary clocks are employed in the verifying operation, which are also used in the time measuring operation by the time measuring section 11, simplification of the circuit construction is also achieved.

When the auxiliary clocks are employed in the verifying operation, it is necessary to know their frequency in advance. The auxiliary clocks are generated by the ring oscillator 19, which is susceptible to individual variations in accuracy due to variations of the semiconductor production processes. Therefore, if the cycle of the auxiliary clocks is verified and calibrated, then more accurate measurement of the travel time become possible.

Figure 6:
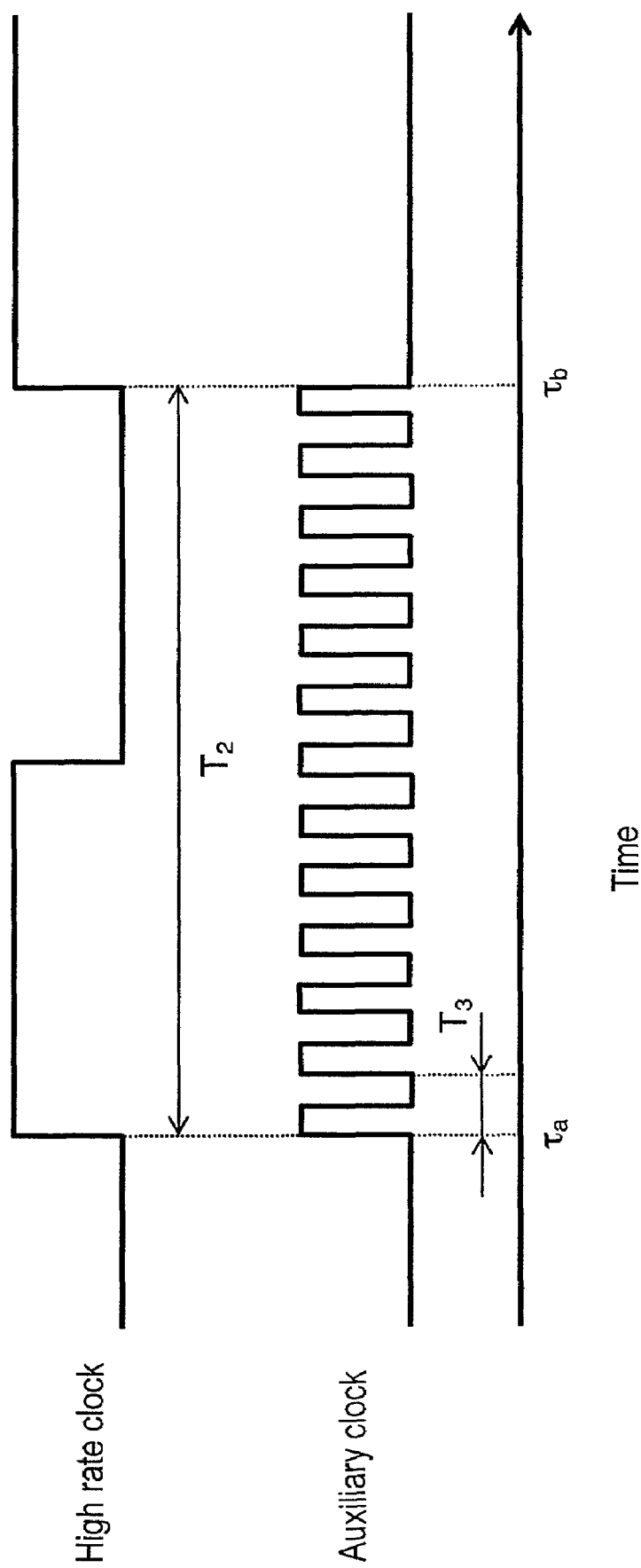
FIG. 6 shows a timing chart illustrating a method of verifying an auxiliary clock of the fluid flow measuring instrument in accordance with the first embodiment of the present invention.

The detailed operation for verifying the auxiliary clocks will be explained with reference to FIG. 6. The auxiliary clocks can be verified, using the high rate clocks. The auxiliary clock is triggered at the same time when the high rate clock rises at time $\tau_a$, and stopped at time $\tau_b$ when the next high rate clock rises. The number of auxiliary clocks counted during the foregoing time period is indicative of the ratio of $T_2$ and $T_3$.

Although the foregoing method does not tell the value of $T_3$ directly, by inputting ratio M (the ratio of $T_1$ and $T_2$) into the equation showing the relationship between $T_1$ and $T_2$, i.e., $T_2 = T_1/\{N+(X-Y)/M\}$, it becomes possible to calibrate the value of $T_2$. If the value of $T_2$ is known, $T_3$ can be determined from the ratio M. In this operation, $T_2$ is used to verify $T_3$; however, since $T_2$ is the time duration of one cycle of the high rate clocks, the verification can be done within a short time and does not consume extra power.

The auxiliary clock can be calibrated, using the low rate clocks. In this case, the frequency of the auxiliary clocks can be determined accurately and directly.

If the verification section 12 conducts the verification while the measurement control section 4 conducts the measurement between time $\tau_1$ when transmission section 6 starts applying a square wave to the first oscillator 2 and time $\tau_2$ when the comparison section 9 detects the reception wave, it is not necessary to operate the high rate clock or the auxiliary clock only to conduct the verification, thereby realizing the power saving effect.

If the verification section finds that the cycle of the high rate clock deviates from a given proper range (e.g., between −2% and +2%) due to external disturbances such as noise, a predetermined standard value is used as the verified value to define the oscillating cycle of the high rate clock, using which to calculate a travel time. Under this operation, even if the verification operation temporarily yields an erroneous value, it is possible to conduct the measurement operation and thus possible to conduct the reliable flow measuring operation free from being affected by noise or the like.

Although the fluid flow measuring instrument in accordance with this first embodiment employs, as the high rate clock generator, the ceramic oscillation circuit, which is known as being quick in rising, either a CR oscillation circuit or an LC oscillation circuit can be used in the high rate clock generator.

Embodiment 2

Figure 7:
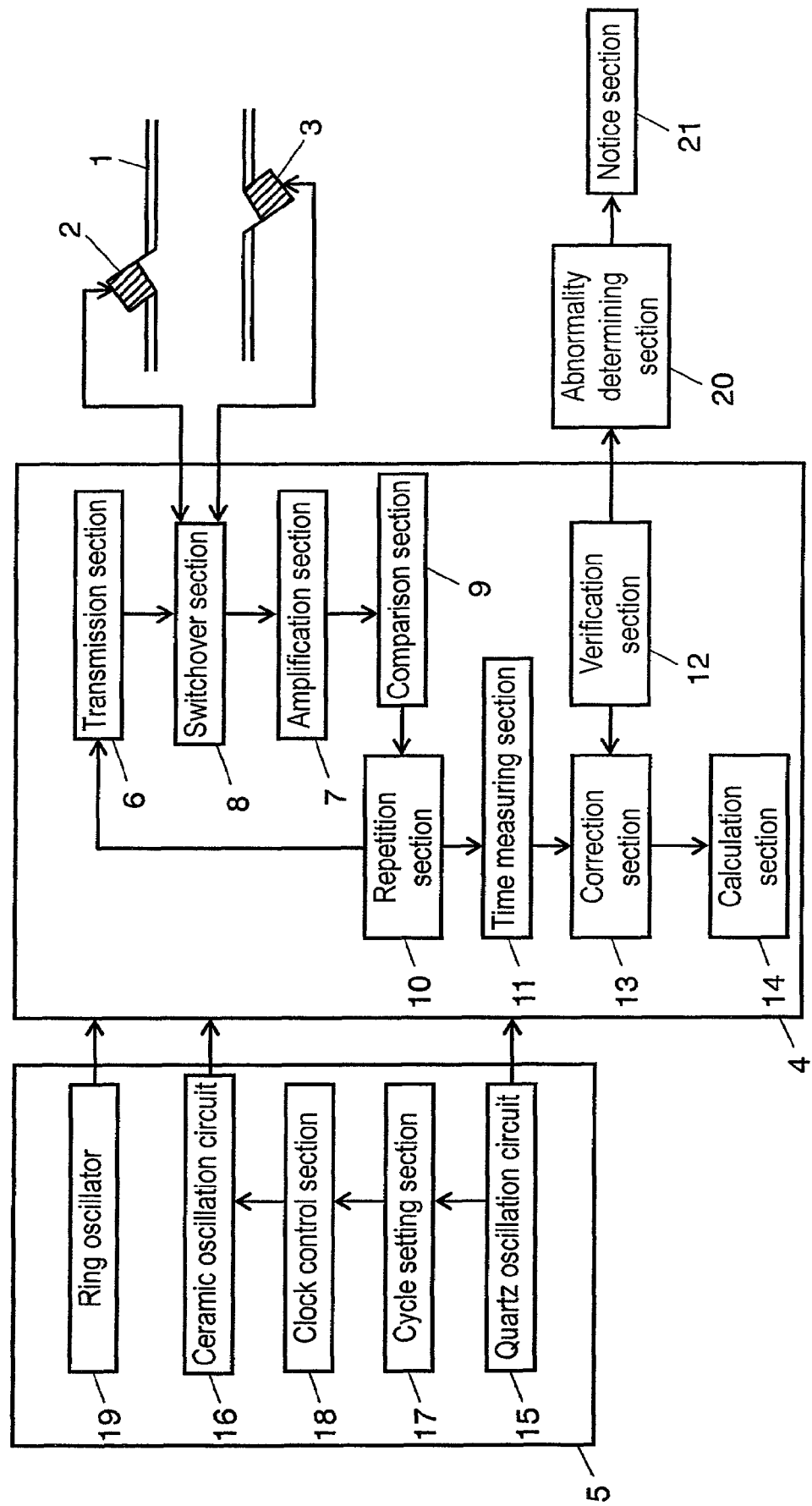
FIG. 7 shows a block diagram of a fluid flow measuring instrument in accordance with a second embodiment of the present invention.

FIG. 7 shows a block diagram of a fluid flow measuring instrument in accordance with the second embodiment of the present invention. Since the essential part of FIG. 7 is the same as that of FIG. 1, the detailed descriptions thereof will be omitted, and only the differences will be explained.

In FIG. 7, an abnormality determining section 20 determines whether or not a result of the verification performed by the verification section 12 is abnormal, and a notice section 21 notifies the outside, via a communication line, of the abnormality detected by the abnormality determining section 20.

The abnormality determining section 20 determines that some abnormality has occurred if the oscillation cycle of the high rate clocks or the oscillation cycle of the auxiliary clocks verified by the verification section 12 has gone out of the proper range multiple times in a row due to external disturbances such as noise, as discussed in the first embodiment.

The construction in accordance with the second embodiment makes possible to notify the user of an occurrence of abnormality during the measuring operation, and solve the abnormality, thereby improving the maintainability of the instrument.

The notice section 21 is not limited to the construction using the communication line. For instance, it can use an acoustic or visual warning to notify users around the instrument of an abnormality.

Embodiment 3

Figure 8:
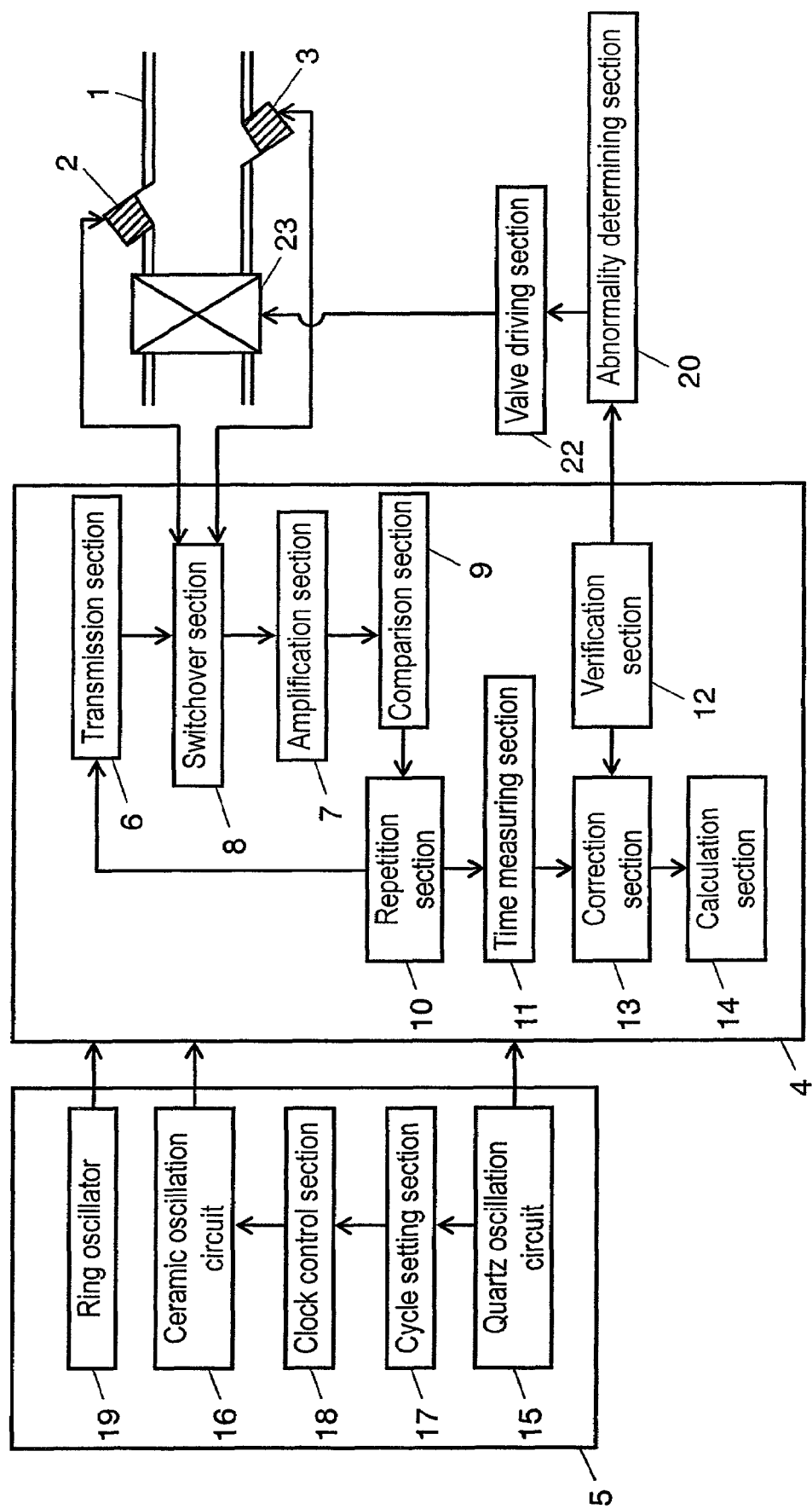
FIG. 8 shows a block diagram of a fluid flow measuring instrument in accordance with a third embodiment of the present invention.
Figure 9:
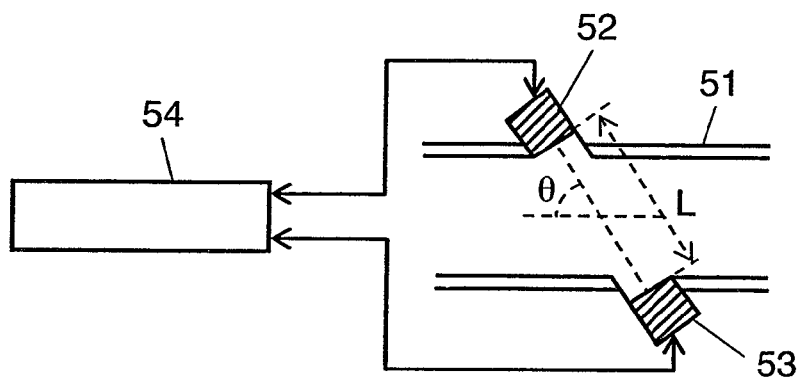
FIG. 9 shows a block diagram of a conventional fluid flow measuring instrument.
Figure 10:
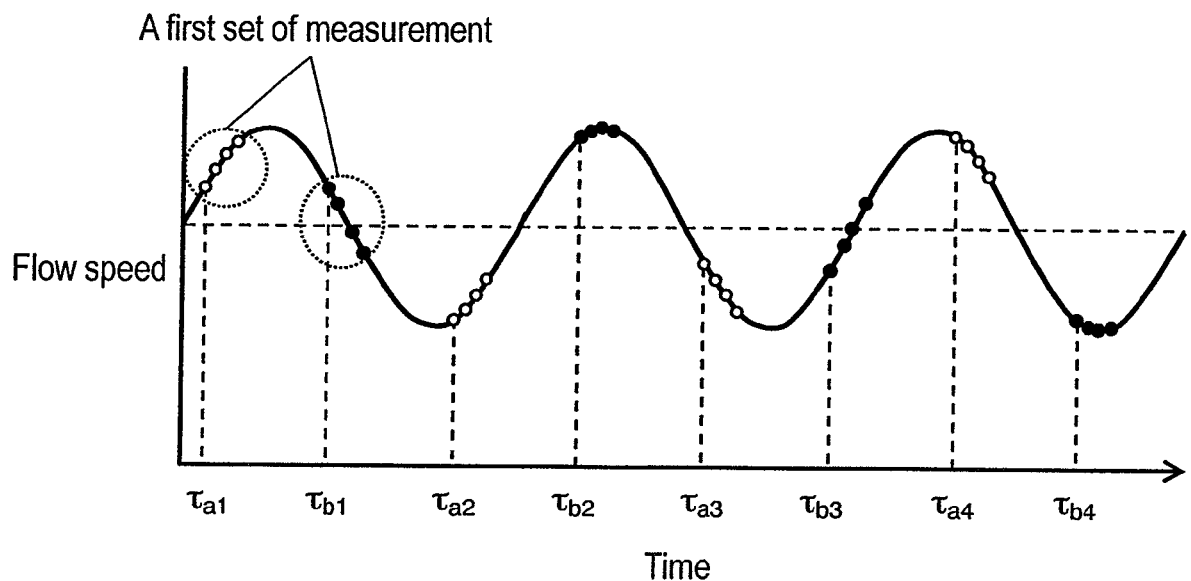
FIG. 10 shows a timing chart illustrating an operation of the conventional fluid flow measuring instrument.

FIG. 8 shows a block diagram of a fluid flow measuring instrument in accordance with the third embodiment of the present invention. Since the essential part of FIG. 8 is the same as FIG. 1 and FIG. 7, the detailed descriptions thereof will be omitted, and only the differences will be explained.

FIG. 8 illustrates an application of the present invention to a gas meter with a safety function which determines the status of gas consumption, based on the measurement results, and shuts off the gas flow if any abnormality is detected. When the abnormality determining section 20 determines that something abnormal is detected in a verification result obtained by the verification section 12, a valve driving section 22 shuts off a valve 23 to shut off the fluid flow. What the abnormality determining section 20 recognizes as abnormal is the same as described in the second embodiment.

This structure can shut off the gas flow, so that the users can prevent a gas accident caused by an abnormality in the gas flow measurement.

INDUSTRIAL APPLICABILITY

A fluid flow measuring instrument of the present invention can reduce power consumption involved in the measuring operations, whereby a power saving measurement operation is achievable while being able to keep up with cyclic changes in flow volume. The instrument can be used for instance in a gas meter.

The invention claimed is:

1. A fluid flow measuring instrument which measures a flow rate of fluid using a propagation time of an ultrasonic wave through the fluid, comprising:
    a first clock configured to output a first clock signal;
    a second clock configured to output a second clock signal faster than the first clock signal;
    a measurement control section configured to perform measuring operations at regular intervals in which the propagation time is measured, using the second clock signal; and
    a clock control section configured to count the regular intervals, using the first clock signal, to have initiated the measuring operations by the measurement control section and activate the second clock only for a time period needed for the measuring operation by the measurement control section.

2. A fluid flow measuring instrument according to claim 1, further comprising a third clock configured to output a third clock signal faster than the second clock signal.

3. A fluid flow measuring instrument according to claim 2, wherein the third clock is activated only for at least one time segment within the time period, and the measurement control section measures the propagation time, using the first and third clock signals.

4. A fluid flow measuring instrument according to claim 3, wherein the measurement control section uses the third clock signal to augment measurement of the propagation time within a cycle duration of the second clock signal.

5. A fluid flow measuring instrument according to claim 2, further comprising a verification section configured to determine a cycle duration of the second clock signal, using a cycle duration of the first clock signal.

6. A fluid flow measuring instrument according to claim 2, wherein the third clock is formed of a ring oscillator.

7. A fluid flow measuring instrument according to claim 5, wherein the third clock is activated only for at least one time segments within the cycle duration of the first clock signal to augment determination of the cycle duration of the second clock signal by the verification section.

8. A fluid flow measuring instrument according to claim 5, wherein the verification section determines a cycle duration of the third clock signal, using the determined cycle duration of the second clock signal.

9. A fluid flow measuring instrument according to claim 5, wherein the verification section determines a cycle duration of the third clock signal, using the cycle duration of the first clock signal.

10. A fluid flow measuring instrument according to claim 5, wherein the verification section determines the cycle duration of the second clock signal during the measuring operation by the measuring control section.

11. A fluid flow measuring instrument according to claim 5, wherein if the cycle duration of the second clock signal determined by the verification section goes out of a predetermined range, a predetermined value is used for calculation of the propagation time.

12. A fluid flow measuring instrument according to claim 5, further comprising a notice section configured to notify that the cycle duration of the second clock signal determined by the verification section goes out of a predetermined range.

13. A fluid flow measuring instrument according to claim 5, further comprising a valve shutting-off section for shutting off flow of the fluid if the cycle duration of the second clock signal determined by the verification section goes out of a predetermined range.

14. A fluid flow measuring instrument according to claim 8, wherein the verification section determines the cycle duration of the third clock signal during the measuring operation by the measuring control section.

15. A fluid flow measuring instrument according to claim 8, wherein if the cycle duration of the third clock signal determined by the verification section goes out of a predetermined range, a predetermined value is used for calculation of the propagation time.

16. A fluid flow measuring instrument according to claim 8, further comprising a notice section configured to notify that the cycle duration of the third clock signal determined by the verification section goes out of a predetermined range.

17. A fluid flow measuring instrument according to claim 8, further comprising a valve shutting-off section for shutting off flow of the fluid if the cycle duration of the third clock signal determined by the verification section goes out of a predetermined range.

18. A fluid flow measuring instrument according to claim 1, wherein the second clock is formed of any one of a ceramic oscillation circuit, a CR oscillation circuit, and an LC oscillation circuit.

19. A fluid flow measuring instrument according to claim 1, wherein the first clock is formed of a quartz oscillation circuit.

* * * * *